No. 756,711. PATENTED APR. 5, 1904.
R. P. RUKENBROD.
ELECTRIC CONTROLLER FOR ALTERNATING CURRENTS.
APPLICATION FILED JAN. 26, 1903.
NO MODEL. 3 SHEETS—SHEET 1.
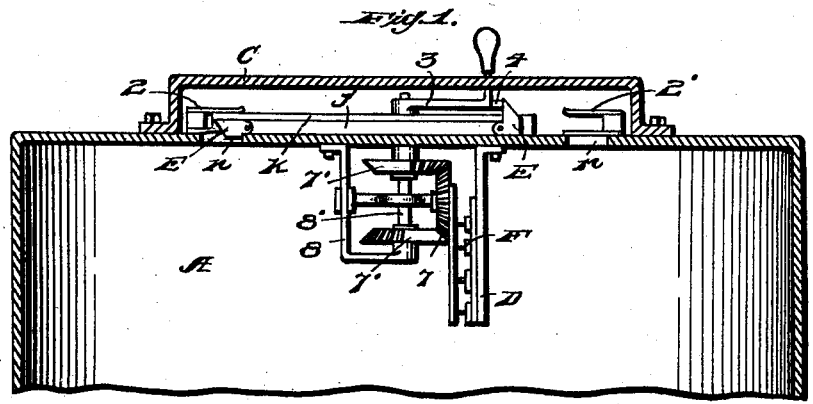
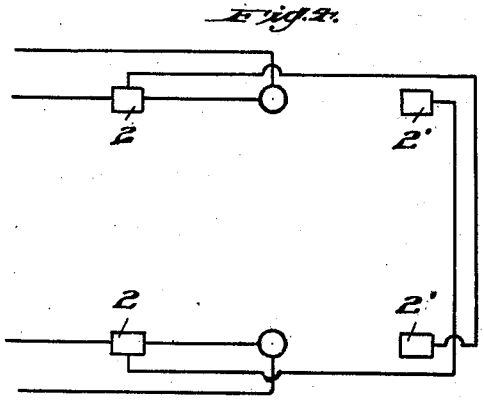
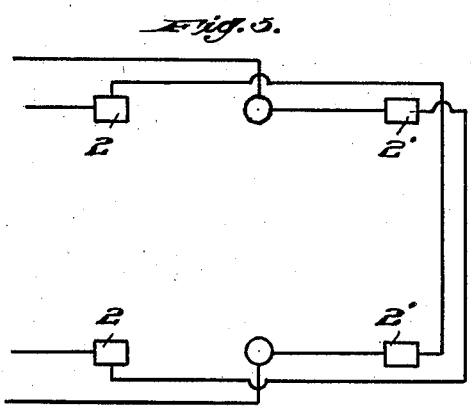
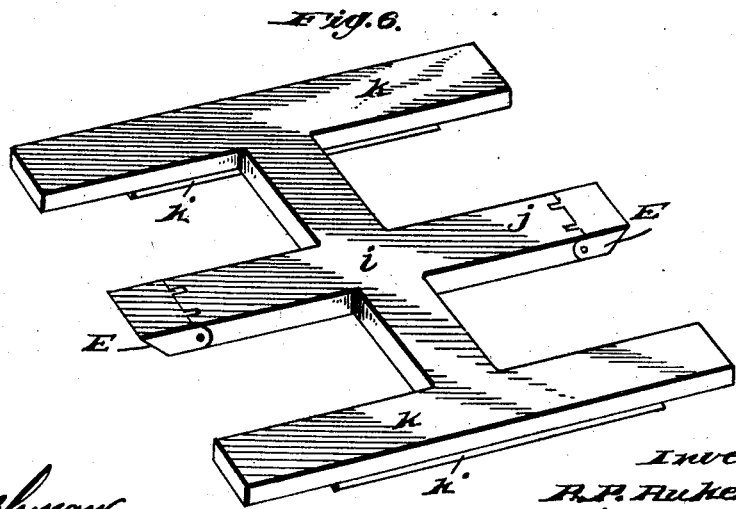

No. 756,711. PATENTED APR. 5, 1904.
R. P. RUKENBROD.
ELECTRIC CONTROLLER FOR ALTERNATING CURRENTS.
APPLICATION FILED JAN. 26, 1903.
NO MODEL. 3 SHEETS—SHEET 2.
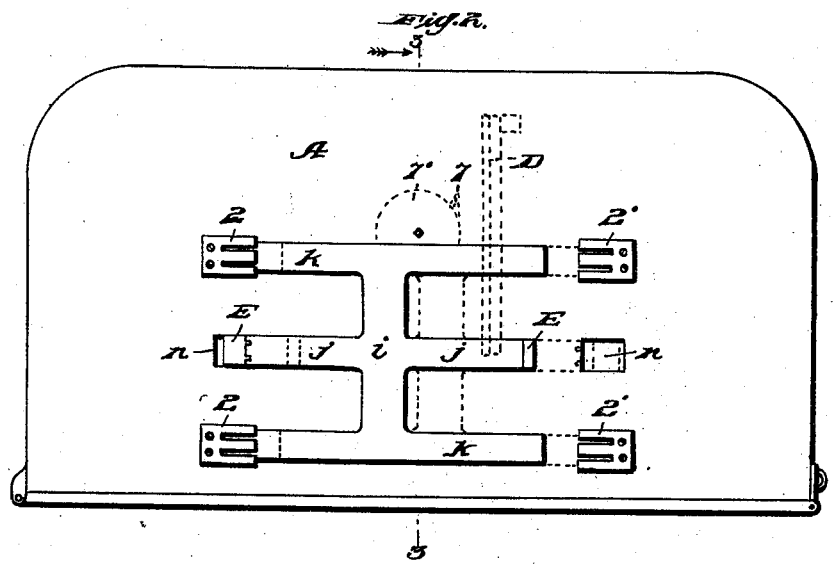
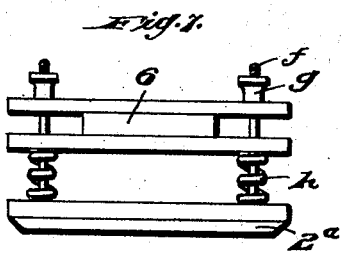
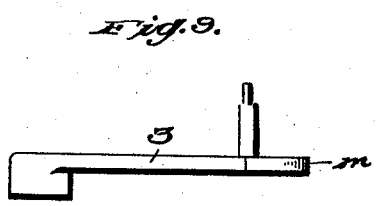
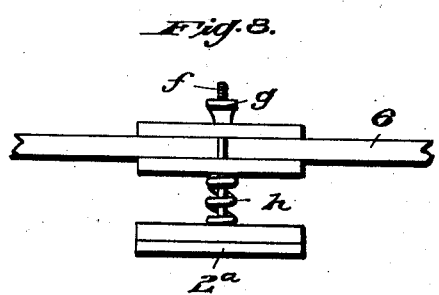
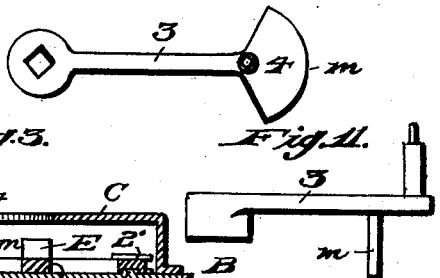
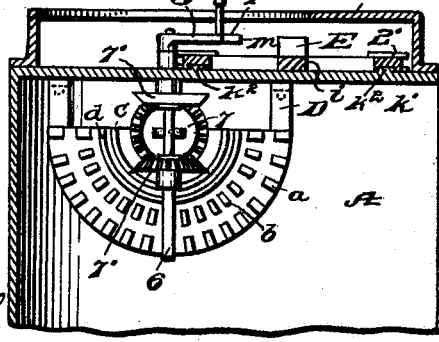

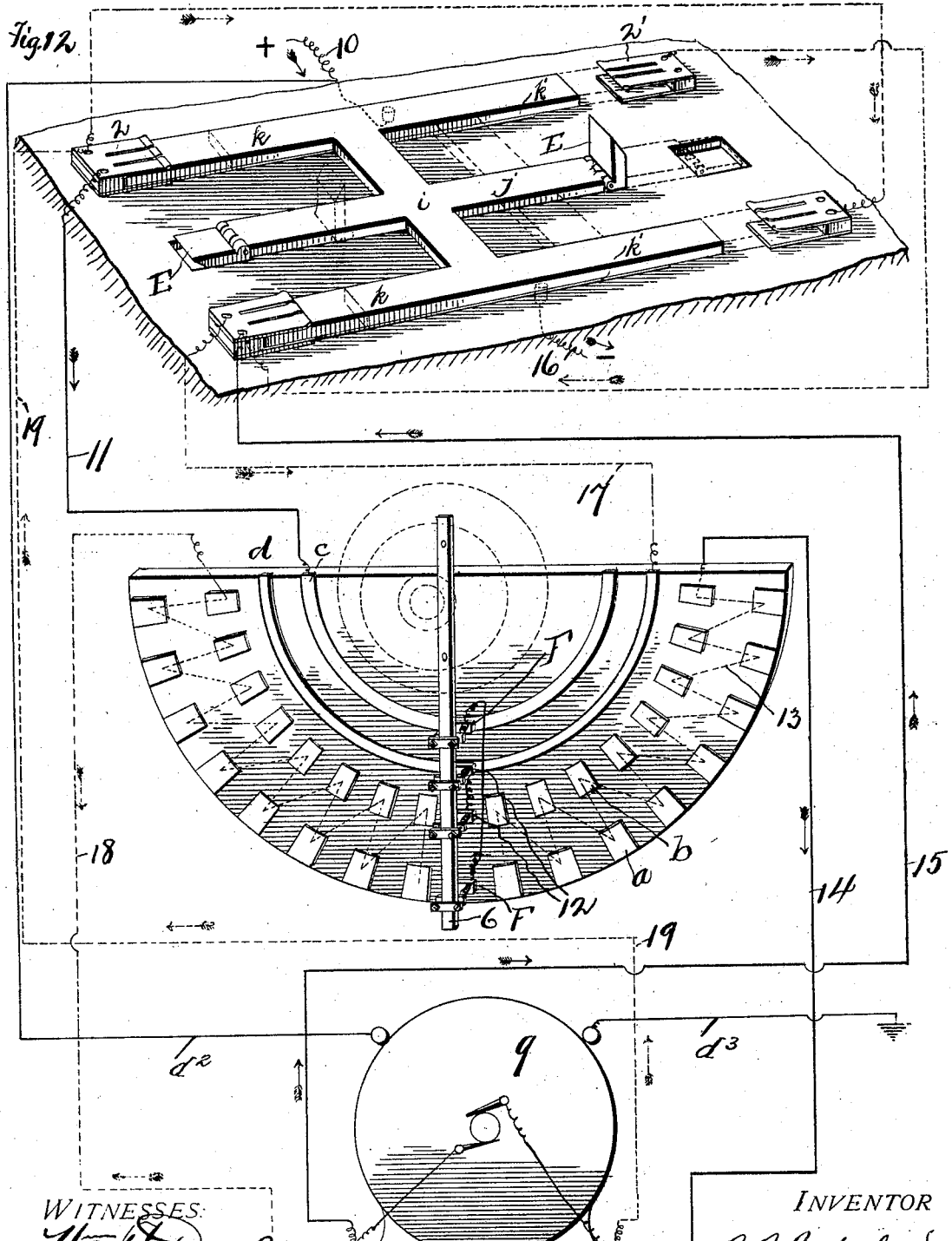

No. 756,711. Patented April 5, 1904.

UNITED STATES PATENT OFFICE.

ROBERT P. RUKENBROD, OF TURTLECREEK, PENNSYLVANIA.

ELECTRIC CONTROLLER FOR ALTERNATING CURRENTS.

SPECIFICATION forming part of Letters Patent No. 756,711, dated April 5, 1904.

Application filed January 26, 1903. Serial No. 140,497. (No model.)

*To all whom it may concern:*

Be it known that I, ROBERT P. RUKENBROD, a citizen of the United States of America, residing at Turtlecreek, in the county of Allegheny and State of Pennsylvania, have invented certain new and useful Improvements in Electric Controllers for Alternating Currents, of which the following is a specification.

This invention relates to electrical controllers of the hand-operated type.

One object of the invention is to produce a controller in which novel means are provided to throw the reversing-switch to contact with the terminals for conducting the current in the direction desired and for moving the contact-plates over the resistance-block.

Furthermore, an object of the invention is to produce a controller in which the reversing-switch is reciprocated through the medium of an operating-arm which serves also to move the contact-blocks.

Furthermore, the object of the invention is to produce a controller in which the reversing-switch or other parts will possess advantages in points of simplicity, efficiency, and inexpensive construction.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Figure 1 is a vertical sectional view of a controller-casing with the internal parts in elevation. Fig. 2 is a plan view of the controlling-switch with parts omitted. Fig. 3 is a sectional view on a line corresponding with the line 3 3 of Fig. 2. Figs. 4 and 5 are diagrammatic views of the circuit through the controlling-switch. Fig. 6 is a perspective view of the controlling-switch plate. Figs. 7 and 8 are detail views of the contact-blocks. Figs. 9 and 10 are detail views of the controlling-arm or crank-handle. Fig. 11 is a modified view of the controlling-arm or crank-handle. Fig. 12 is a diagrammatic view with parts in perspective and elevation.

In the drawings, A indicates the controlling-casing, having a top B, in which the reversing-switch mechanism (to be hereinafter described) is stationed, and C is a cover for said reversing-switch.

D is a hanger depending from the top of the casing and contains the resistance-terminal blocks $a$ $b$, which are suitably connected to the electrical source. An arm 6 has contacts F for engaging the resistance-terminals $a$ $b$ and the conductor $c$ from the electrical source and the conductor $d$ to the reversing-switch. The contact comprises engaging plates $2^a$, having a threaded stem $f$, which passes through the arm and is secured by a thumb-nut $g$. A spring $h$, interposed between the plates and arm, affords a yielding means for retaining the plates away from the arms.

The latches E are swung on their pivots as the switch $i$ slides, and owing to the flat end of the latch sliding on the casing the crank-handle moves the said switch.

In Fig. 7 the plate has two stems, one at each end, operating the same as described.

There are four contacts on the arm engaging the terminal-blocks and the conductors.

The reversing-switch has a connection leading from one plate of the arm, said switch comprising a central bar $i$ with integral arms $j$ and $k$, the former being provided with pivotally-attached ends E, which are adapted to lie in line with the arms $j$ or to stand at right angles to the length of the arms and act as bearings for the camming-surface $m$ of the segmental end 4 of the crank-handle 3, thus causing said handle to force the arm along the surface of the casing. The ends when down lie in the holes $n$ in the top of the casing, acting as latches. The under surface of the arms $k$ have dovetail grooves $k'$ fitting a rib or track $k^2$ of the top of the casing to allow the arms to travel thereon. The ends E being pivoted near their upper edges and as their lower edges extend only slightly below the edge of the casing, the said ends will swing on their pivots when the lever is operated.

The arm 6 is attached to the bevel gear-wheel 7 and travels according to the direction of rotation of said wheel. A bracket 8 depends from the casing and carries bearings for the vertical shaft 8', said shaft being rotated by the crank-handle. Mutilated beveled gear-wheels 7' 7' are carried on the shaft 8', and the mutilated portions of the wheels are out of alinement in order that the wheels 7' will not operate on the wheel 7 simultaneously.

The arms $k$ of the reversing-switch are adapted to contact with the terminals 2 2', according to the direction of operation of the crank-handle.

In Fig. 1 the contact-arms engage terminals 2 when the circuit established is that shown in Fig. 4; but if the arms were thrown to engage with terminals 2' the circuit established would be as shown in Fig. 5. After the arms are in contact further movement of the crank-arm rotates the wheels 7', causing the wheel 7 to carry the contact-arm with the contacts engaging the resistance-terminal blocks.

The current to the motor 9 is supplied, by means of a feed-wire 10, through the contact 2, by the conductor 11, to the conductor $c$. The contacts F are electrically connected, and the contacts 12 are electrically connected. Hence the current from the conductor $c$ is carried to the terminals $a$ by the contact F, then through the resistance-coil 13 to the conductor 14 and to the motor, from the motor, by the conductor 15, to the contact of the switch, and to the conductor 16.

In reversing the current the conductors 17 and $d$, contacts 12 12, resistance 13, and conductor 18 are employed to supply the current, and the conductor 19 returns the current to the switch. The current to and from the field is carried by the conductors $d^2$ and $d^3$, respectively.

Having fully described the invention, what I claim as new, and desire to secure by Letters Patent, is—

1. In a controller, resistance-terminals and conductors, an arm having contacts for the terminals and conductors, a reversing-switch comprising arms and contacts, pivoted ends for certain of the arms, said ends being alternately in line with and at right angles to the arms and means engaging the ends for moving the arms, as and for the purpose described.

2. In a controller, resistance-terminals and conductors, an arm having contacts for the terminals and conductors, a reversing-switch comprising arms and contacts, pivoted ends for certain of the arms, said ends alternately lying in line with and at right angles to the arms, a crank-handle and a camming projection on the handle coöperating with the ends of the arms, as and for the purpose described.

3. In a controller, a casing, ribs on the top of the casing, arms slidable on the ribs, said casing having openings in its top, pivoted ends for certain of the arms, said ends alternately lying in line with and at right angles to the arms, contacts for the arms, suitable conductors for the current and means for sliding the arms on the ribs as and for the purpose described.

In testimony whereof I affix my signature, in the presence of two witnesses, this 24th day of January, 1903.

ROBERT P. RUKENBROD.

Witnesses:
JOHN NOLAND,
J. P. APPLEMAN.